(12) United States Patent
Suzuki et al.

(10) Patent No.: US 9,539,688 B2
(45) Date of Patent: Jan. 10, 2017

(54) MACHINE TOOL

(75) Inventors: Toshihiro Suzuki, Aiko-gun (JP); Mayumi Kazuya, Aiko-gun (JP); Izumi Araki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 79 days.

(21) Appl. No.: 14/410,239

(22) PCT Filed: Jun. 25, 2012

(86) PCT No.: PCT/JP2012/066185
§ 371 (c)(1),
(2), (4) Date: Dec. 22, 2014

(87) PCT Pub. No.: WO2014/002173
PCT Pub. Date: Jan. 3, 2014

(65) Prior Publication Data
US 2015/0367472 A1 Dec. 24, 2015

(51) Int. Cl.
*B23Q 11/08* (2006.01)
*B23Q 11/00* (2006.01)
(Continued)

(52) U.S. Cl.
CPC ......... *B23Q 11/0891* (2013.01); *B23Q 1/015* (2013.01); *B23Q 1/017* (2013.01); *B23Q 1/66* (2013.01);
(Continued)

(58) Field of Classification Search
CPC . B23Q 11/08; B23Q 11/0825; B23Q 11/0883; B23Q 11/0891; B23Q 11/0816; B23Q 2011/0808; B23B 7/10; B23B 25/04; Y10T 409/30392; Y10T 409/401925; Y10T 74/2191; Y10T 74/2193; Y10T 74/2194
(Continued)

(56) References Cited

U.S. PATENT DOCUMENTS 3,783,709 A * 1/1974 Scott .................. F16P 3/08
192/133
5,897,430 A * 4/1999 Haller ................ B23Q 11/0891
451/451
(Continued)

FOREIGN PATENT DOCUMENTS

| JP | 2-53548 | 2/1990 |
| JP | 10-180585 | 7/1998 |

(Continued)

OTHER PUBLICATIONS

International Search Report mailed Aug. 28, 2012, directed to International Application No. PCT/JP2012/066185; 2 pages.

*Primary Examiner* — Daniel Howell
*Assistant Examiner* — Yasir Diab
(74) *Attorney, Agent, or Firm* — Morrison & Foerster LLP

(57) ABSTRACT

A work-machine splash guard for enclosing a space for machining a workpiece, and preventing the spraying of chips and machining fluid, is equipped with: a front-surface door for opening and closing in the horizontal direction via an arc-shaped movement, and positioned on the front-surface side of the work machine; a side-surface door for opening and closing by performing an arc-shaped movement that is concentric with the front-surface door, and overlapping with the front-surface door; and door-locking switches for selectively allowing the opening/closing of the front-surface door and the side-surface door according to an opening/closing pattern.

2 Claims, 4 Drawing Sheets

(51) Int. Cl.
  *B23Q 1/01* (2006.01)
  *B23Q 1/66* (2006.01)
  *F16P 3/02* (2006.01)
  *B23B 25/04* (2006.01)
  *F16P 3/10* (2006.01)
  *B23B 7/10* (2006.01)

(52) U.S. Cl.
  CPC ....... *B23Q 11/0053* (2013.01); *B23Q 11/0057* (2013.01); *B23Q 11/0067* (2013.01); *B23Q 11/0089* (2013.01); *F16P 3/02* (2013.01); *B23B 7/10* (2013.01); *B23B 25/04* (2013.01); *B23Q 11/08* (2013.01); *B23Q 11/0816* (2013.01); *B23Q 11/0825* (2013.01); *B23Q 11/0883* (2013.01); *F16P 3/10* (2013.01); *Y02P 70/171* (2015.11); *Y10T 74/2191* (2015.01); *Y10T 74/2193* (2015.01); *Y10T 74/2194* (2015.01); *Y10T 409/30392* (2015.01); *Y10T 409/401925* (2015.01)

(58) Field of Classification Search
  USPC .................................................. 451/451, 455
  See application file for complete search history.

(56) References Cited

U.S. PATENT DOCUMENTS

| | | | | |
|---|---|---|---|---|
| 6,082,939 | A * | 7/2000 | Nakashima | B23Q 1/58 409/134 |
| 6,296,599 | B1 * | 10/2001 | Staiger | B23Q 7/06 409/134 |
| 6,499,816 | B1 * | 12/2002 | Beadel | B23Q 11/0825 312/209 |
| 6,752,573 | B2 * | 6/2004 | Haller | B23Q 1/012 409/134 |
| 2008/0168860 | A1 * | 7/2008 | Nishi | B23Q 11/0891 74/616 |
| 2009/0145030 | A1 * | 6/2009 | Landerer | B23Q 11/0891 49/41 |
| 2009/0324354 | A1 * | 12/2009 | Hara | B23Q 11/0891 409/134 |

FOREIGN PATENT DOCUMENTS

| | | |
|---|---|---|
| JP | 11-114767 | 4/1999 |
| JP | 2007-190623 | 8/2007 |
| JP | 2010-5759 | 1/2010 |
| WO | WO-2008/029485 | 3/2008 |

* cited by examiner

MACHINE TOOL

CROSS REFERENCE TO RELATED APPLICATIONS

This application is a U.S. National Phase patent application of PCT/JP2012/066185, filed on Jun. 25, 2012, which is hereby incorporated by reference in the present disclosure in its entirety.

FIELD OF THE INVENTION

The invention relates to a machine tool, in particular a machine tool provided with a splashguard for preventing chips and machining liquid from scattering during machining of a workpiece under NC (numerical control).

BACKGROUND OF THE INVENTION

Conventionally, splashguards, enclosing machine tools, have been used in order to prevent chips and machining liquid from scattering during machining in machine tools. Splashguards generally are provided with a door provided in a front panel or a side panel in order to access a tool attached to the end of a spindle or a workpiece which is machined by the tool. For example, Patent Document 1 discloses a machine tool cover provided with a plurality of arcuate doors.
Patent Document 1: Japanese Unexamined Patent Publication No. H11-114767

SUMMARY OF THE INVENTION

According to the cover for a machine tool of Patent Document 1, the plurality of arcuate doors are opened and closed through arcuate motions. However front side door cannot be singly opened and close. Therefore, it encounters a problem that all of the doors must be opened in order to access the front part of a machining region, and accordingly any design of interlock must deactivate completely the machining process by deactivating the rotation of spindle and the supply of machining liquid.

The invention is directed to solve the problem of the prior art, and the objective of the present invention is to provide a machine tool with a splashguard provided with a plurality of linear or arcuate doors configured so that a door (front door) adjacent a preparation chamber can be singly opened and closed or a door (lateral side door) adjacent a machining chamber can be singly opened and closed.

Further, the objective of the present invention is to provide a machine tool with a compact and convenient splashguard improved to ensure the safety and the efficiency of manual tool change and a preparation during machining with a double-sided workpiece mount.

According to the present invention, there is provided a splashguard for enclosing a space for machining a workpiece and preventing chips and machining liquid from scattering, characterized in that the splashguard comprises:

a preparation chamber side door provided at the preparation chamber side of the machine tool so as to horizontally open and close;

a machining chamber side door disposed adjacent the preparation chamber side door so as to open and close in the same direction;

a door locking switch for allowing selectively the preparation chamber side door and machining chamber side door to be opened and closed depending on opening and closing patterns.

According to the present invention, the preparation chamber side door (front door) and the machining chamber side door (lateral side door) can be separately opened and closed in the same direction, and therefore selectively opened and closed as needed. The provision of a door locking switch which allows selectively the opening and closing of the preparation chamber side door (front door) and the machining chamber side door (lateral side door) depending on opening and closing patterns provides convenient door opening and closing patterns, for example, allowing the doors to be opened only when the spindle of a machine tool and supply of the machining liquid are deactivated whereby the effect of the production and the safety are ensured.

DETAILED DESCRIPTION OF THE INVENTION

Figure 1:
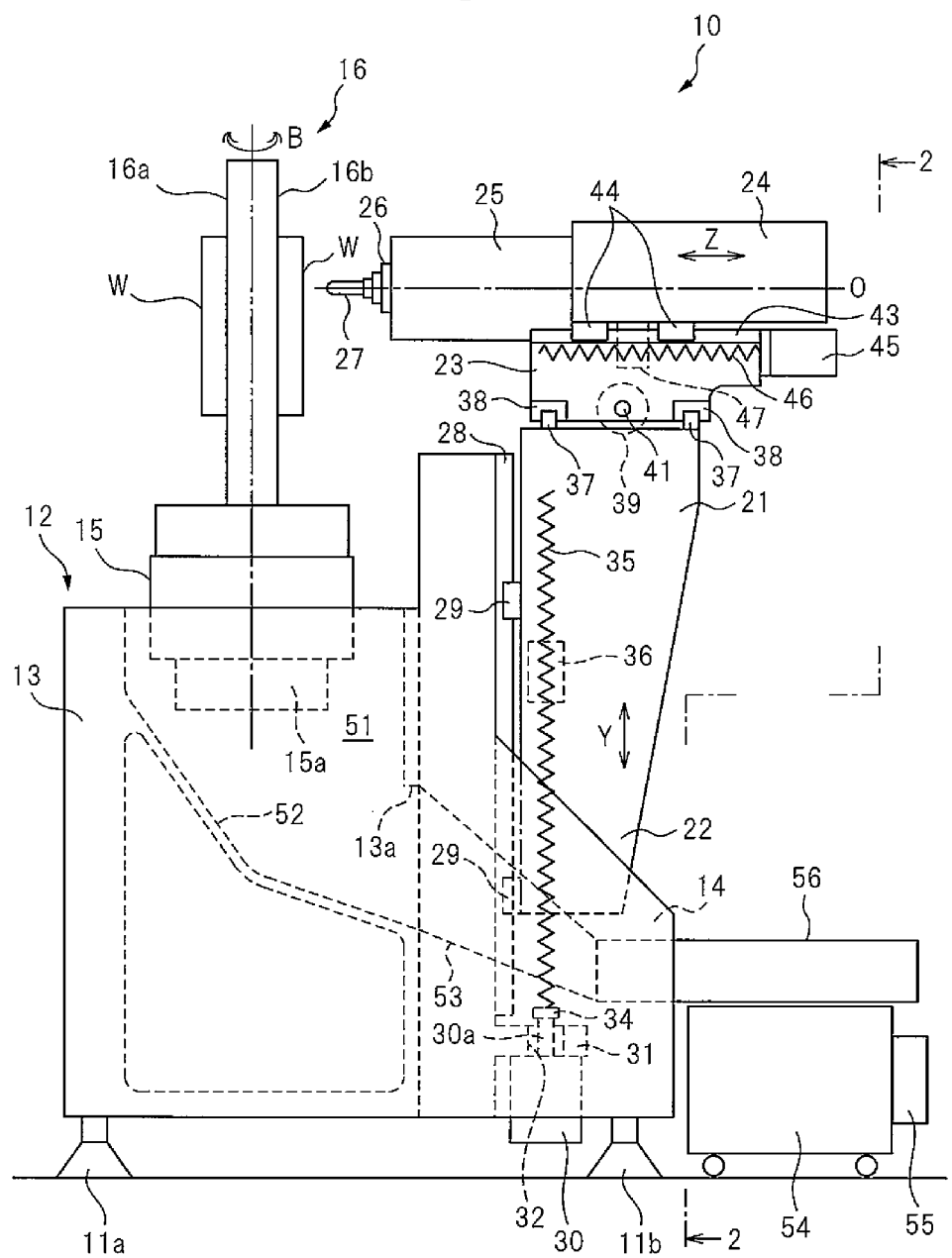
FIG. 1 is a side view schematically showing the configuration of a machine tool according to an embodiment of the invention.
Figure 2:
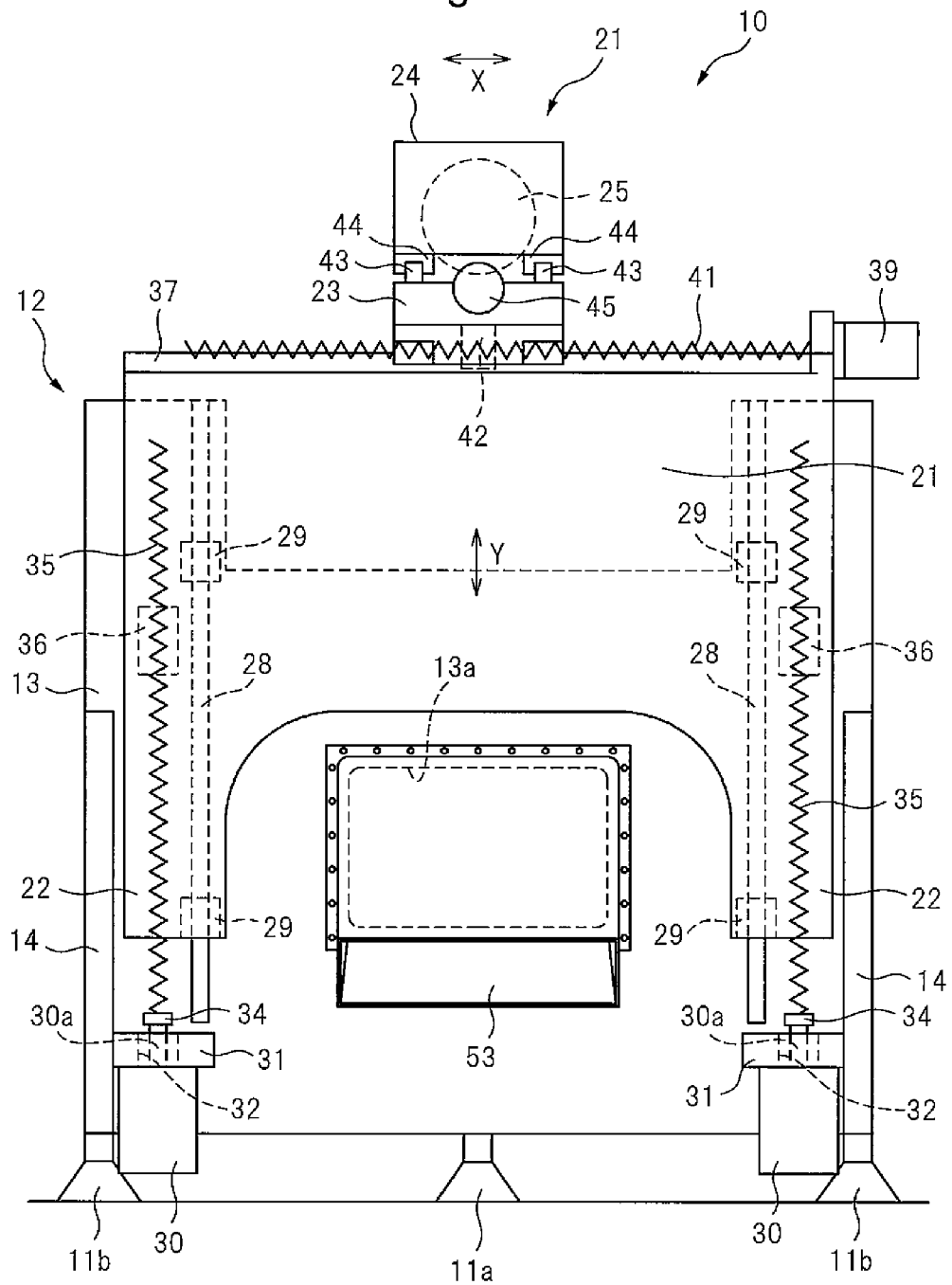
FIG. 2 is a rear view of the machine tool in the direction of arrows 2-2 in FIG. 1.
Figure 3:
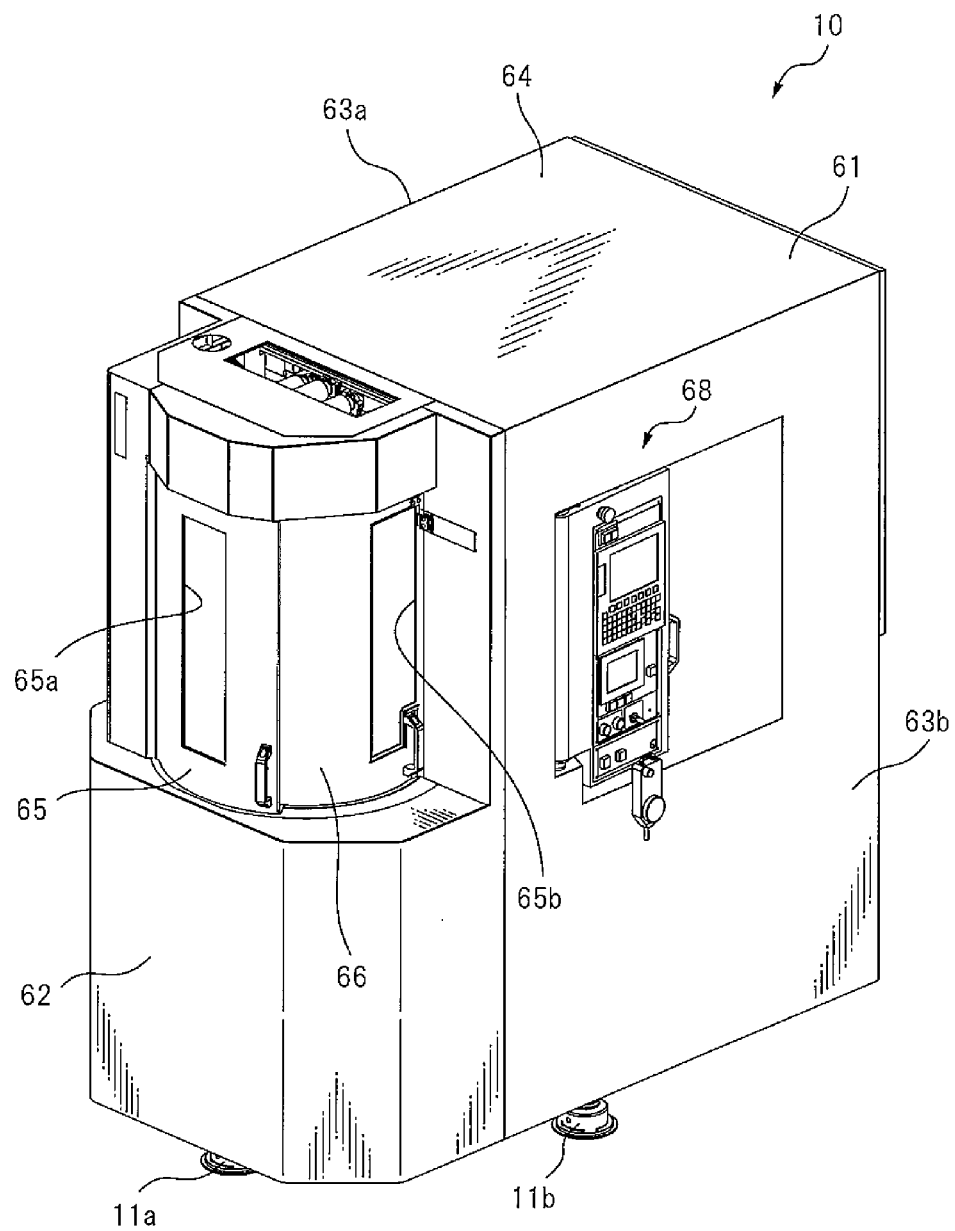
FIG. 3 is a perspective view of the exterior of the machine tool with a splashguard enclosing the machine tool.
Figure 4:
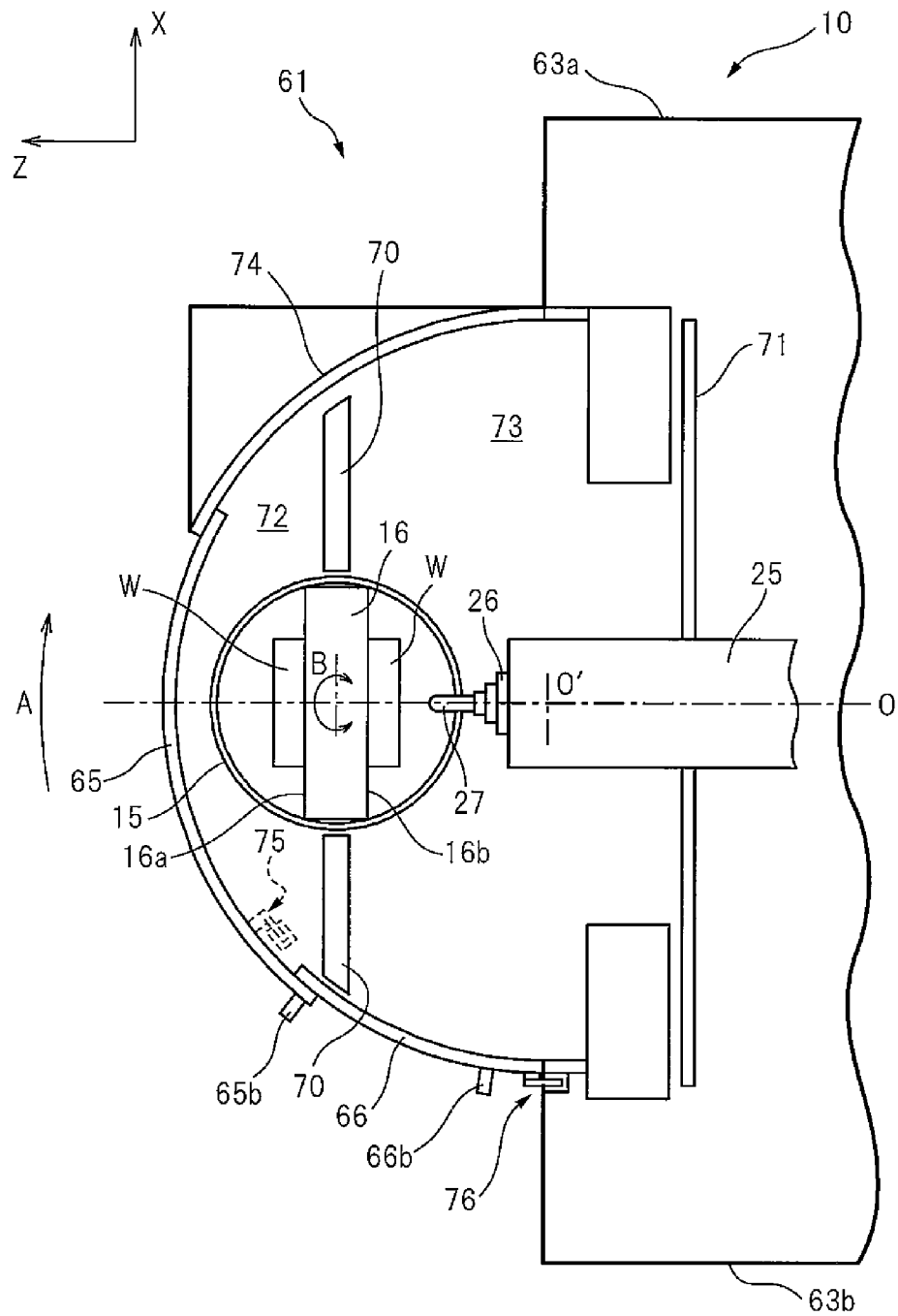
FIG. 4 is a partial sectional view of the splashguard of FIG. 3 showing sliding doors according to an embodiment of the invention.

With reference to the drawings, an embodiment of the invention will be described below. FIG. 1 is a side view schematically showing the structure of a machine tool according to an embodiment of the invention. FIG. 2 is a rear view of the machine tool viewing in the direction of arrows 2-2 in FIG. 1. FIG. 3 is a perspective view schematically showing the exterior of the machine tool with a splashguard. FIG. 4 is a partial sectional view of the splashguard of FIG. 3 showing sliding doors according to an embodiment of the invention. In this specification, a front side of the machine tool is defined by the direction of the tip of a tool attached to the end of a spindle as described below.

In this embodiment, as an example, a machine tool 10 may be a four-axis horizontal machining center having liner feed axes extending in three orthogonal X-, Y- and Z-axes directions and a B-axis providing a rotary feed axis. The left-right direction (perpendicular to the plane of FIG. 1) of the machine tool 10 is defined as the X-axis, the vertical direction is defined as the Y-axis, and the front-rear direction (the left-right direction in FIG. 1) is defined as the Z-axis. The B-axis is a rotary feed axis about a vertical axis parallel to the Y-axis. The machine tool 10 may be, instead of a four-axis horizontal type, for example, a five-axis machine, a vertical machining center, a milling machine, an electric discharge machine, etc.

The machine tool 10 comprises a bed 12 providing a base supported on a floor of a factory. The bed 12 comprises a bed body 13 in the form of a hollow substantially rectangular column and a pair of side walls 14 rearwardly extending in Z-axis direction from a rear face of the bed body 13. The bed 12 is supported by a plurality of, in this embodiment three height-adjustable leveling blocks as supporting members. In particular, the bed 12 is supported by a front leveling block 11a, disposed at the front side center of the bed body 13, and rear leveling blocks 11b disposed at the respective rear ends of the pair of side walls 14.

On the top surface of the bed body 13, a table 15 is arranged. The table 15 is driven by a B-axis servomotor 15a, incorporated in the bed body 13 to rotate about a rotational axis, i.e., B-rotary feed axis, parallel to the Y-axis. On the table 15, a double-faced workpiece mount 16 is fastened. The double-faced workpiece mount 16 includes oppositely defined mounting faces 16a and 16 for mounting workpiece W.

The machine tool 10 comprises a vertically moving body 21 disposed for linear reciprocal movement in the vertical direction along the Y-axis at the back of the bed body 13. At the top of the vertically moving body 21, a left-right moving body 23 is mounted for liner reciprocal movement in the left-right direction along the X-axis. A front-rear moving body 24 is mounted to the left-right moving body 23 for liner reciprocal movement in the front-rear direction along the Z-axis. Mounted to the front-rear moving body 24 is a spindle head 25 for supporting a spindle 26 for rotation about a rotational axis O parallel to the Z-axis. A tool 27 is detachably attached to the end of the spindle 26 so as to face the workpiece W mounted to one of the double-faced workpiece mount 16.

Mounted to the rear side of the bed body 13 are Y-axis guide rails 28, providing a pair of left-right guides extending in the Y-axis direction (vertical direction), and Y-axis ball screws 35, providing a pair of vertical feed screws, disposed outside the Y-axis guide rails 28 so as to extend in the Y-axis direction. Further, brackets 31 are disposed in the rear side of the bed body 13. In this embodiment, the brackets 31 are integrally formed with the side walls 14 so as to extend from the inner side surfaces of the side walls 14. Y-axis servomotors 30, as vertically feed motors, are mounted to and the Y-axis ball screws 35 are rotationally supported by the brackets 31. Brackets 31 define through holes 32 extending in the Y-axis direction from the top surface to the bottom surface, wherein the Y-axis servomotors 30 are mounted to the bottom surfaces of the brackets 31 so that their output shafts 30a extends upwardly through the respective through holes 32. The output shafts 30a are connected to the lower ends of the Y-axis ball screws 35 by couplings 34. Y-axis ball screws 35 are disposed as possible as near the rear leveling blocks 11b.

The vertically moving body 21 comprises a pair of left-right legs 22 which are apart from each other or formed into a bifurcated fork downwardly extending in the Y-axis direction. Y-axis guide blocks 29 are mounted to the vertically moving body 21. The vertically moving body 21 is supported on the Y-axis guide rails 28 through the Y-axis guide blocks 29 for sliding along the Y-axis guide rails 28. As shown in FIG. 2, the Y-axis guide blocks 29 are position so that the Y-axis guide rails 28 are overlapped by the pair of legs 22 when the vertically moving body 21 is mounted to the rear side of the bed body 13. In particular, the vertically moving body 21 is provided with a pair of top and bottom Y-axis guide blocks 29 for each of the pair of Y-axis guide rails 28 whereby at least one of the Y-axis guide blocks 29 of each of the pairs is always disposed on each of the pair of legs 22.

Further, mounted to the vertically moving body 21 are nuts 36 for engaging the Y-axis screws 36. When the Y-axis servomotors 30 are rotated, the vertically moving body 21 is vertically driven in accordance with the direction and the amount of the rotation of the Y-axis servomotors 30. In this connection, the Y-axis servomotors 30 and the Y-axis ball screws 35 provide vertically moving means of the invention. Provision of at least one of the Y-axis ball screws 35 may be sufficient. The left-right size of the vertically moving body 21 may be a minimum length allowing the vertically moving body to accommodate the guide blocks 29 whereby the vertically moving body may have laterally extending portions for mounting the nuts 36 to reduce its weight.

Mounted to the top of the vertically moving body 21 are X-axis guide rails 37, providing a pair of left-right guides extending in the X-axis direction, and an X-axis ball screw 41, providing a left-right feed screw disposed between the pair of the X-axis guide rails 37 so as to extend in the X-axis direction. X-axis guide blocks 38 are mounted to the left-right moving body 23. The left-right moving body 23 is supported on the X-axis guide rails 37 through the X-axis guide blocks 38 for sliding along the X-axis guide rails 37 in the left-right direction. An X-axis servomotor 39 is mounted to the vertically moving body 21 as a left-right feed motor. Output shaft (not shown) of the X-axis servomotor 39 is connected to the X-axis ball screw 41 by a coupling (not shown). A nut 42, engaging the X-axis ball screws 41, is mounted to the left-right moving body 23 whereby when the X-axis servomotor 39 is rotated, the left-right moving body 23 is driven in the left-right direction in accordance with the direction and the amount of the rotation of the X-axis servomotor 39. The X-axis servomotor 39 and the X-axis ball screw 41 provide left-right driving means of the invention.

Mounted to the top of the left-right moving body 23 are Z-axis guide rails 43, providing a pair of front-rear guides extending in the Z-axis direction, and a Z-axis ball screw 46, providing a front-rear feed screw disposed between the pair of the Z-axis guide rails 43 so as to extend in the Z-axis direction. Z-axis guide blocks 44 are mounted to the front-rear moving body 24. The front-rear moving body 24 is supported on the Z-axis guide rails 43 through the Z-axis guide blocks 44 for sliding along the Z-axis guide rails 43 in the front-rear direction. A Z-axis servomotor 45 is mounted to the left-right moving body 23 as a front-rear feed motor. An output shaft (not shown) of the Z-axis servomotor 45 is connected to the Z-axis ball screw 46 by a coupling (not shown). Nut 42, engaging the Z-axis ball screw 46, is mounted to the front-rear moving body 24 whereby when the Z-axis servomotor 45 is rotated, the front-rear moving body 24 is driven in the front-rear direction in accordance with the direction and the amount of the rotation of the Z-axis servomotor 45. The Z-axis servomotor 45 and the Z-axis ball screw 46 provide front-rear driving means of the invention.

A built-in type spindle motor (not shown) is incorporated in the spindle head 25. The spindle 26 and tool 27 are rotationally driven by the spindle motor about the rotational axis O. The tool 27 is moved relative to the workpiece W by the linear motion of the left-right moving body 21 and the front-rear moving body 24 in the X-, Y- and Z-axes directions. The relative movement is controlled by an NC device (not shown) incorporated in the machine tool 10. The rotating tool 27 contact the workpiece W at a machining point when the tool 27 and the workpiece W move relative to each other. Accordingly, the workpiece is machined into a desired shape.

As shown in FIG. 1, the bed body 13 defines an upwardly opening cavity 51. A chute 52 is defined in the inner wall of the cavity 51 under the table 15. The rear side of the bed body 13 defines an opening 13a as an outlet for chips. The chute 52 is defined by a slope lowering from the front side of the bed body 13 rearwardly toward the opening 13a and downwardly inclined surfaces defined by the left and right inner walls. The chips generated during the machining of the workpiece W and the machining liquid injected to machining areas in the workpiece W will fall from around the table 15 into the cavity 51, then move toward the opening 13a along the chute 52.

A chip removing duct 53, for removing the chips and the machining liquid outside the machine tool, i.e., outside the cavity 51 of the bed body 13, is mounted to the rear side of the bed body 13. The chip removing duct 53 extends rearwardly from the rear side of the bed body 13 to pass between the legs 22 of the vertically moving body 21. The chip removing duct 53 is mounted at one end thereof to the rear side of the bed body 13 by for example screws bolts so as to enclose the opening 13a. The other end 53b of the duct 53 is configured to be connected to a chip receptacle 56. The chip receptacle 56 is a member in the form of an upwardly opening shallow tray having a meshed bottom wall (now shown). A machining liquid reservoir 54 is placed under the chip receptacle 56. The chip removing duct 53 is downwardly inclined, i.e., closing the floor, from the chute 52 toward the machining liquid reservoir 54. Thus, the chips and the machining liquid, discharged outside the machine tool through the opening 13a, are directed to the chip receptacle 56 by the chip removing duct 53. In the chip receptacle 56, the machining liquid will fall into the machining liquid reservoir 54 after it is filtered by the meshed bottom wall of the chip receptacle 56 whereby only the chips are deposited on the bottom wall of the chip receptacle 56. The chips remaining in the chip receptacle 56 will be periodically collected by an operator.

The machining liquid reservoir 54 contains the machining liquid from the chute 52 through chip removing duct 53. A pump 55 is mounted to the machining liquid reservoir 54. The pump 55 directs the machining liquid, contained in the machining reservoir 54, to the machining areas in the workpiece W. A filter (not shown) may be provided in the machining liquid reservoir 54 in order to further remove fine chips before the supply to the machining areas. Thus, the machining liquid is reused.

The machine tool 10 is provided with a splashguard 61 in the form of for example a box containing all of the above-described components. The splashguard 61 a front panel 62, left and right side panels 63a and 63b and a top panel 64, respectively covering a front lower part, the sides and the top and rear side of the machine tool 10. A front upper part of the machine tool 10, in particular the space where the double-faced workpiece mount 16 is disposed, is covered by slid doors 65 and 66. The slide doors 65 and 66 include rectangular monitoring windows 65a and 66a. Transparent glass plates are fitted in the monitoring windows.

A control panel 68 is incorporated in the right side panel 63b. The control panel 68 is connected to the above-described NC device. In the control panel 68, a display panel, displaying the operation states of the above-described components, and a various input buttons are disposed. An operator of the machine tool 10 can input a machining program and a various machining parameters to the NC device. A machining program may be input through a communication network, such as a LAN in a factory.

With reference to FIG. 4, the space above the bed 12 where the double-faced workpiece mount 16 is disposed is a machining region enclosed by a fixed arcuate wall 74, first and second movable sliding doors 65 and 66 and a sliding plate 71. The first sliding door 65, providing a preparation chamber door (a front door), is disposed at the front side of the machine tool 10 for arcuate motion about the center O' in the horizontal direction so as to open and close. The second sliding door 66, providing a machining chamber door (a side door) moves arcuately about the center O' the same as the first sliding door 65 so as to overlap with the first sliding door 65 for opening and closing. In this embodiment, the center O' for the arcuate motions of the first and second sliding doors 65 and 66 is aligned with the rotational axis O of the spindle 27 when the spindle head 25 is positioned at the center of the X-axis stroke. Further, handles 65b and 66b are attached to the first and second sliding doors 65 and 66 respectively for opening and closing.

In the machining region, a partition wall 70 extends, in a plane including the rotational axis, B-axis, of the table 15, perpendicularly to the rotational axis O of the spindle 26. When the table 15 is rotated about B-axis so that the double-faced workpiece mount 16 is substantially perpendicular to the axis O of the spindle 26, as shown in FIG. 4, the machining region is divided into a preparation chamber 72, defined by the near side or front side first sliding door 65, the partition wall 70 and the double-faced workpiece mount 16, and a machining chamber 73, defined by the far side or arcuate wall 74, the partition wall 70, the double-faced workpiece mount 16, the sliding plate 71 and the flank second sliding door 66. The sliding plate 71 follows the movement of the spindle head 25 so as to always close the rear side of the machining chamber 73. The first and second sliding doors 65 and 66 can be independently slid whereby an operator can access the preparation chamber 72 by sliding to open the first sliding door 65 in direction of arrow A, and also can access the machining chamber 73 by sliding to open the second sliding door 66 in the direction of the arrow A.

The machine tool 10 is further provided with an interlock for preventing the opening of the first and second sliding doors 65 and 66 in connection with the operating status of the machine tool 10. With reference to FIG. 4, the first sliding door 65 is provided with a first door locking switch 75, and the second sliding door 66 is provided with a second door locking switch 76. It should be noted that the door locking switch 75 is placed in a position so as to not interrupt the opening and closing motion of the second sliding door 66. The first and second door locking switches 75 and 76 include a contact (not shown), which allows electric current to flow to an interlock circuit (not shown) across the door locking switches when the first and second sliding doors 65 and 66 are closed, and a locking mechanism (not shown), which blocks, when the interlocking circuit inhibits the opening of the sliding doors, the opening of the first and second sliding doors 65 and 66 according to the interlock inhibition. A programmable controller using a limit switch or solenoid may be used as the interlock circuit.

The first and second sliding doors 65 and 66 are not limited to the arcuate doors which arcuately move to open and close. For example, in FIG. 4, a splashguard, in the form of a trapezoid having a long side adjacent the sliding plate 71, a short side adjacent the first sliding door 65 and parallel to the X-axis, and oblique sides respectively adjacent the arcuate wall 74 and second sliding door 66, may be used. In this case, a linear first sliding door (a preparation chamber side door) disposed at a part of the oblique side, adjacent the second sliding door 66, forward of the partition wall 70, and a linear second sliding door (a machining chamber side door) disposed adjacent the first linear sliding door rearward of the partition wall 70 so that each of the sliding doors linearly and obliquely moves backward independently for opening and closing.

Alternatively, in FIG. 4, a rectangular splashguard, having a long side adjacent the sliding plate 71, another long side adjacent the first sliding door 65 and parallel to the X-axis, and short sides respectively adjacent the arcuate wall 74 and second sliding door 66 and parallel to the X-axis, may be used. In this case, a linear first sliding door (a preparation chamber side door) disposed at a part of the short side, adjacent the second sliding door 66, forward of the partition wall 70, and a linear second sliding door (a machining chamber side door) disposed adjacent the first linear sliding door rearward of the partition wall 70 so that each of the sliding doors moves linearly and independently for opening and closing.

The operation of the present embodiment and the interlock will be described below.

(1) In Case that Only the First Sliding Door 65 is Opened

When the B-axis is positioned at 0° or 180°, i.e., as shown in FIG. 4, when the double-faced workpiece mount 16 is at 90° relative to the rotational axis O of the spindle 26, the interlock unlocks the locking mechanism of the first door locking switch 75. This allows the first sliding door 65 to be opened. On the other hand, when the first sliding door 65 is opened, the interlock inhibits the rotation of the B-axis and maintains the position of the B-axis at 0° or 90°. This allows the operator to open the first sliding door 65 and access safely the preparation chamber 72 in order to demount a machined workpiece W from the mounting face 16a of the double-faced workpiece mount 16, and mount a non-machined workpiece (not shown) to the mounting face whereby the workpieces are changed even when the spindle 26 of the machine tool 10 rotates to machine the workpiece W. When the first sliding door 65 is closed and the contact of the first door locking switch 75 is closed, the interlock allows the rotation of B-axis.

(2) In Case that Only the Second Sliding Door 66 is Opened

When the spindle 26, the B-axis and the supply of the machining liquid are deactivated, the interlock unlocks the locking mechanism of the second door locking switch 76 whereby the second sliding door 66 can be opened. At that time, the unlock condition is satisfied if the B-axis is deactivated regardless of its rotational position. When the second sliding door 66 is opened, the interlock inhibits the rotations of the spindle 26 and the B-axis and the supply of the machining liquid. This allows an operator to open the second sliding door 66 safely and access the machining chamber 73 for operations, for example, manually changing tools, cleaning the machining chamber 73, or debagging the machining process. When the second sliding door 66 is closed and the second door locking switch is closed, first, the interlock disengages the inhibition of the rotation of the B-axis. In this connection, it should be noted that, at that time, the first sliding door 65 is closed. Then when the B-axis is moved at 0° or 90° according to a command from for example the NC device, the interlock disengage the inhibition of the rotation of the spindle 26 and the supply of the machining liquid, i.e., these operations are allowed.

(3) In Case that Both the First and Second Sliding Doors 65 and 66 are Opened at the Same Time When above-described conditions (1) and (2) are satisfied together, i.e., when the spindle 26, B-axis and the supply of the machining liquid are deactivated and the B-axis is at 0° or 90°, the interlock unlocks the locking mechanism of the first door locking switch 75 at the same time the locking mechanism of the second door locking switch 76 is unlocked. This allows the first sliding door 65 to be opened in addition to allowing the second sliding door to be opened. When both the first and second sliding doors 65 and 66 are opened, the interlock inhibits the rotations of the spindle 26 and the B-axis and the supply of the machining liquid. When both the first and second sliding doors 65 and 66 are opened, although the first sliding door 65 cannot be singly closed, due to the configuration of the first and second sliding doors 65 and 66, the second sliding door 66 can be singly closed. When the second sliding door 66 is closed and the first sliding door 65 is opened, the interlock disengages the inhibition of the rotation of the spindle 26 and the supply of the machining liquid to allow these operations to be activated. In this connection, it should be noted that the interlock inhibits the rotation of the B-axis when the first sliding door 65 is opened.

As described above, the splashguard 61 of the machine tool 10 according to the embodiment, the front side first sliding door 65 and the lateral side second sliding door 66 can be separately opened and closed by the concentric arcuate movements, which allows selective open and close of the respective sliding doors as needed. Further, the machining region within the splashguard 61 is divided into the preparation chamber 72 and the machining chamber 73 by the double-faced workpiece mount 16, mounted to the table 15 rotatable about B-axis, and the partition wall 70 disposed around the double-faced workpiece mount 16. This configuration allows, when the workpiece W, mounted to one 16b of the workpiece mount faces of the double-faced workpiece mount 16, preparation of a workpiece to the other 16a of the workpiece mount faces.

The interlock, provided with the first and second door locking switches 75 and 76, allows the front side first sliding door 65 to be singly opened and closed during machining for preparation of a workpiece W, allows the lateral side second sliding door 66 to be singly opened and closed for changing tool 72 manually, and allows the first and second sliding doors 65 and 66 to be fully opened by opening them together. Thus, according to the present embodiment, both or one of the first and second sliding doors 65 and 66 can be opened and closed while ensuring the safety of an operator.

Further, the Y-axis servomotors 30 and the Y-axis ball screws 35 are disposed rear side of the bed body 13, and the Y-axis servomotors 30 are connected to the lower ends of the Y-axis ball screws 35. In the embodiment, the Y-axis guide rails 28, the Y-axis servomotors 30 and the Y-axis ball screws 35 are disposed below the spindle head 25. In particular, the Y-axis guide rails 28 extend so that their lower ends are positioned near the floor, and the servomotors 30 are also disposed adjacent the floor. As a result, the gravity center of the machine tool 10 can be lowered compared with conventional machine tools. Furthermore, higher stability of the machine tool 10 than ever before is realized by forming the vertically moving body 21 to have the bifurcated legs 22, which accommodate the chip removing duct 53, and by disposing guide blocks 29 to the legs 22 so as to support and guide the vertically moving body 21 with relatively long vertical span. Accordingly, the machining accuracy of the machine tool 10 can be increased. Further, the over-all height of the machine tool 10 can be reduced because the Y-axis servomotors 30 must not be disposed on the top of the machine tool 10.

The vertically moving body 21 may be configured to slide vertically along a pair of Y-axis guide rails 28 which may be disposed to extend vertically along the rear lateral sides of the bed 12, which does not have the left and right side walls 14 extending rearwardly from the rear side of the bed body 13, instead of the rear side of the bed body 13.

REFERENCE SIGNS LIST

10 Machine Tool
12 Bed
14 Side Wall
15 Table

16 Double-Faced Workpiece Mount
16a Workpiece Mounting Face
16b Workpiece Mounting Face
21 Vertically Moving Body
22 Leg
23 Left-Right Moving Body
24 Font-Rear Moving Body
25 Spindle Head
26 Spindle
27 Tool
28 Y-axis Guide Rail
37 X-axis Guide Rail
43 Z-axis Guide Rail
61 Splashguard
62 Front Panel
63a Left Side Panel
63a Right Side Panel
64 Top Panel
65 First Sliding Door
66 Second Sliding Door
70 Partition Wall
71 Sliding Plate
72 Preparation Chamber
73 Machining Chamber
74 Arcuate Wall
75 First Door Locking Switch
76 Second Door Locking Switch

The invention claimed is:

1. A machine tool provided with a splashguard for enclosing a space for machining a workpiece and preventing chips and machining liquid from scattering, the machine tool comprising:
    a preparation chamber side door provided at a preparation chamber side of the splashguard so as to horizontally open and close by arcuate motion;
    a machining chamber side door provided at a machining chamber side of the splashguard so as to open and close by arcuate motion in the same direction as, coaxial with and independent of the arcuate motion of the preparation chamber side door, the preparation chamber side door and the machining chamber side door partially overlapping with each other when the two doors are closed;
    a door locking switch for allowing separately the preparation chamber side door and the machining chamber side door to be opened or closed in accordance with three opening and closing patterns of:
    only the preparation chamber side door being allowed to be opened,
    only the machining chamber side door being allowed to be opened, and
    both the preparation chamber side door and the machining chamber side door being allowed to opened at the same time.

2. A machine tool according to claim 1, further comprising a table configured to be fed about B-axis, and a double-faced workpiece mount mounted to the table, the workpiece mount comprising oppositely defined mounting faces, wherein
    the splashguard further comprises a partition wall disposed so as to be in alignment with the double-faced workpiece mount when the double-faced workpiece mount is positioned at a rotational position where the oppositely defined mounting faces are directed toward a front side and a rear side of the machine tool, respectively;
    the machining region is divided into a preparation chamber and a machining chamber;
    opening the preparation chamber side door allows access to the preparation chamber, and opening the machining chamber side door allows access to the machining chamber.

* * * * *